United States Patent
Otto

(10) Patent No.: US 11,130,516 B2
(45) Date of Patent: Sep. 28, 2021

(54) STEER BY WIRE STEERING SYSTEM WITH ADJUSTABLE POLARITY

(71) Applicant: STEERING SOLUTIONS IP HOLDING CORPORATION, Saginaw, MI (US)

(72) Inventor: Jeffrey M. Otto, Auburn, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 624 days.

(21) Appl. No.: 16/036,405

(22) Filed: Jul. 16, 2018

(65) Prior Publication Data

US 2020/0017137 A1 Jan. 16, 2020

(51) Int. Cl.
*B62D 5/04* (2006.01)
*B62D 5/00* (2006.01)

(52) U.S. Cl.
CPC ............. *B62D 5/046* (2013.01); *B62D 5/001* (2013.01); *B62D 5/0421* (2013.01)

(58) Field of Classification Search
CPC ....... B62D 5/046; B62D 5/001; B62D 5/0421
See application file for complete search history.

(56) References Cited

U.S. PATENT DOCUMENTS

| | | | |
|---|---|---|---|
| 9,346,489 B2 * | 5/2016 | Dutsky | B62D 5/0835 |
| 9,434,407 B2 * | 9/2016 | Amin | B62D 15/0235 |
| 2020/0353977 A1 * | 11/2020 | Davies | B62D 5/046 |

* cited by examiner

*Primary Examiner* — Minnah L Seoh
*Assistant Examiner* — Harold Eric Pahlck, III
(74) *Attorney, Agent, or Firm* — Dickinson Wright PLLC

(57) ABSTRACT

A steer by wire steering system for a vehicle includes at least one electrical communication component operatively connecting a handwheel actuator to a roadwheel actuator. Also included is that the at least one electrical communication component is switchable between a first polarity assignment and a second polarity assignment based on a detected driving condition of the vehicle, the first polarity assignment turning a roadwheel in a first direction in response to a first input rotational direction of the handwheel actuator, the second polarity assignment turning the roadwheel in a second direction in response to the first input rotational direction of the handwheel actuator.

15 Claims, 3 Drawing Sheets

STEER BY WIRE STEERING SYSTEM WITH ADJUSTABLE POLARITY

FIELD OF INVENTION

The embodiments disclosed herein relate to electric power steering column assemblies and/or systems and, more particularly, to a steer-by-wire vehicle steering systems having adjustable polarity.

BACKGROUND OF INVENTION

Robustness and understanding of electrical components and safety mechanisms has led to technology being integrated into safety critical systems such as vehicle steering assemblies. An example of one of those enhancements is Steer by Wire (SbW) steering systems, where a driver's input through direct mechanical connection to the roadwheel is removed and replaced with an electrical communication link. This technology is an enabler of several advantages, including package freedom, new safety mechanisms, and flexibility.

A mechanical based steering system inherently includes kinematic constraints for frontward and rearward operation. Vehicle steering knuckle and internal steering gear kinematics (especially for rack and pinon based steering systems) must be designed as a matched pair to ensure that congruent directional control is achieved. For example, rack and pinon based steering systems must match a pinion coupling below the rack bar with a front knuckle vehicle steering geometry (or pinion above rack with rear knuckle steering) to ensure that driver intent is reflected at the roadwheels. Upon implementation in a vehicle assembly, the steering mechanics are considered to be permanently fixed.

Furthermore, during rearward operation in a mechanically linked system, the operator is tasked with reverse logic for intended directional control (a clockwise motion on the handwheel is required to corner the backing vehicle counterclockwise). When a trailer is added for towing, the desire to preserve that reverse logic for control can sometimes add further difficulty in maneuverability.

SUMMARY OF INVENTION

According to an embodiment of the disclosure, a steer by wire steering system for a vehicle includes at least one electrical communication component operatively connecting a handwheel actuator to a roadwheel actuator. Also included is that the at least one electrical communication component is switchable between a first polarity assignment and a second polarity assignment based on a detected driving condition of the vehicle, the first polarity assignment turning a roadwheel in a first direction in response to a first input rotational direction of the handwheel actuator, the second polarity assignment turning the roadwheel in a second direction in response to the first input rotational direction of the handwheel actuator.

According to another embodiment of the disclosure, a steer by wire steering system for a vehicle includes at least one electrical communication component operatively connecting a handwheel actuator to a roadwheel actuator. Also included is at least one electrical communication component switchable between a plurality of polarity assignments based on a detected driving condition of the vehicle, the plurality of polarity assignments comprising a first polarity assignment, a second polarity assignment and a third polarity assignment, the first polarity assignment turning a roadwheel in a first direction in response to a first input rotational direction of the handwheel actuator when the vehicle is in a forward driving mode, the second polarity assignment turning the roadwheel in a second direction in response to the first input rotational direction of the handwheel actuator when the vehicle is in a rearward driving mode without a trailer, the third polarity assignment turning the roadwheel in the first direction in response to the first input rotational direction of the handwheel actuator when the vehicle is in a rearward driving mode with a trailer.

These and other advantages and features will become more apparent from the following description taken in conjunction with the drawings.

BRIEF DESCRIPTION OF EACH FIGURE OF DRAWING

The subject matter that is regarded as the subject invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION OF EMBODIMENTS OF INVENTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
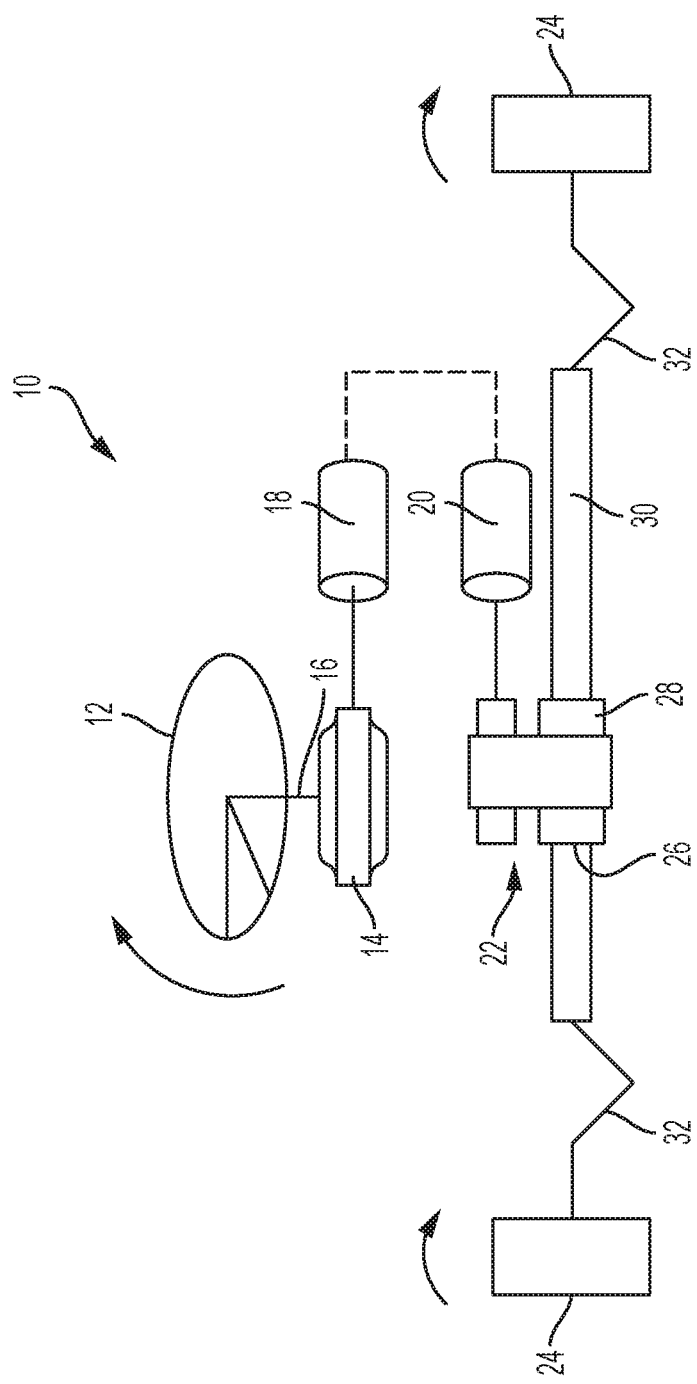
FIG. 1 is a schematic illustration of a steer by wire steering system operating in a first polarity condition according to an aspect of the disclosure during forward operation of a vehicle.

Referring now to FIG. 1, a steer by wire steering system is schematically illustrated and referred to generally with numeral 10. In the illustrated embodiment, a steering handwheel 12 is operatively connected to a handwheel actuator 14 via one or more shafts 16. The handwheel 12 and/or the shaft(s) 16 may be referred to individually or separately as a steering input device. The handwheel actuator 14 is operatively connected to a first motor 18, which is an active feedback motor in some embodiments. The first motor 18 is in electrical communication with a second motor 20 that is operatively connected to a roadwheel actuator 22. The roadwheel actuator 22 is operatively coupled to at least one roadwheel 24 via a mechanical system. In the illustrated embodiment, the mechanical system is a Rack Based Electric Power Steering system 26, wherein rotation of a pulley set and ball screw 28 drives a rack 30. The rack 30 is operatively coupled to the roadwheel(s) 24 via a linkage 32 or a similar mechanical structure.

In operation, rotation of the steering input device (i.e., handwheel/shaft) in one direction is detected by the first motor 18, which is in electrical communication with the second motor 20 to send a signal indicative of the steering input device rotation. The second motor 20 drives the rack and pinion to impart movement of the roadwheel(s) 24 for a steering maneuver. Rotation of the steering input device in a first direction causes movement of the roadwheel(s) 24 in a first direction to execute a steering direction of the vehicle in a first direction. Conversely, rotation of the steering input device in a second direction (i.e., opposite of first rotational direction) causes movement of the roadwheel(s) 24 in a second direction to execute a steering direction of the vehicle in a second direction.

In the embodiments described herein, the electrical components (e.g., first motor 18 and second motor 20) have polarity assignments that are switchable based on a driving condition of the vehicle. The polarity assignment(s) result in flexibility in the effects of rotational commands of the steering input device on the roadwheels 24. The flexibility of these effects provide simplification of rearward maneuvers of the vehicle, as some drivers consider conventional rearward maneuvers to be unintuitive. Additionally, the polarity switching allows for design flexibility and modification, as will be understood from the description herein.

Figure 2:
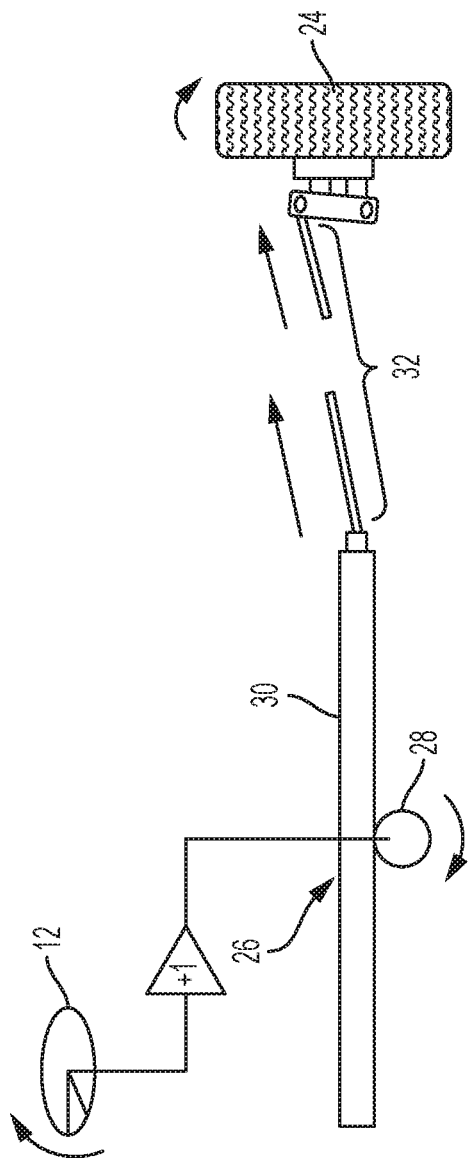
FIG. 2 is a schematic illustration of a steer by wire steering system operating in a second polarity condition according to another aspect of the disclosure during forward operation of the vehicle.
Figure 3:
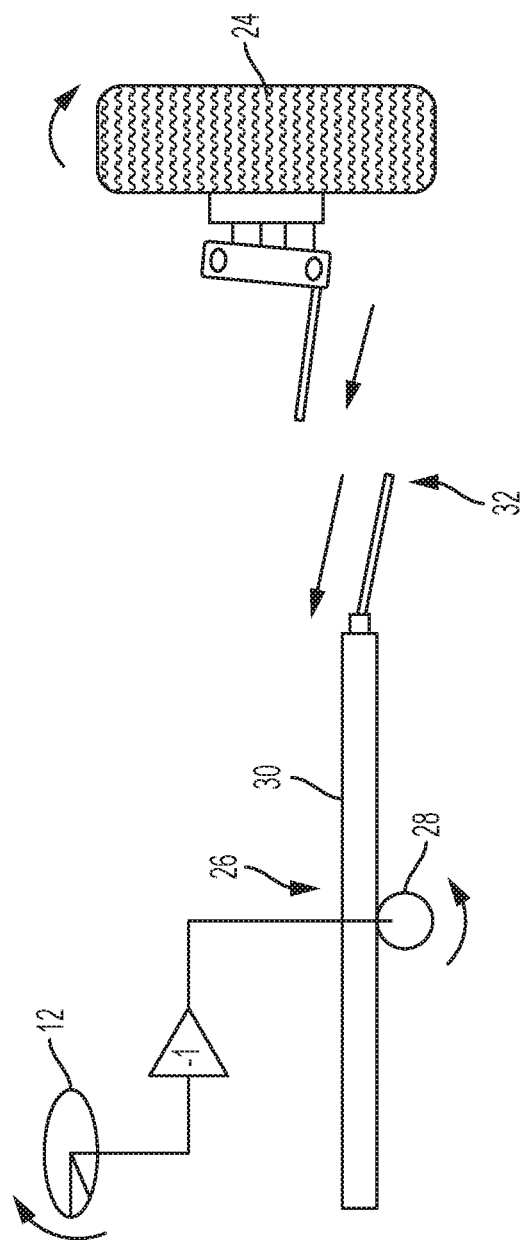
FIG. 3 is a schematic illustration of the steer by wire steering column system operating in a second polarity condition during rearward operation of the vehicle.

FIGS. 2 and 3 illustrate different mechanical connections between the rack based electric power steering system 26 and the roadwheel(s) 24. In particular, FIG. 2 illustrates a front knuckle steering geometry and FIG. 3 illustrates a rear knuckle steering geometry. Each distinct geometry results in a different rotation direction of the roadwheel 24, and therefore the vehicle, with the same input rotation direction by the handwheel 12. The mechanical connection geometry between the rack based electric power steering system 26 and the roadwheel 24 may be dictated by design considerations. Therefore, flexibility to switch the direction of rotation relationship between the handwheel 12 and the roadwheel 24 is desirable. In the embodiment of FIG. 2, rotation of the handwheel 12 and the pulley set and ball screw 28 is synchronized, such that rotation of the handwheel 12 in the illustrated clockwise direction causes rotation of the pulley set and ball screw 28 in the clockwise direction. However, in the embodiment of FIG. 3, rotation of the handwheel 12 and the pulley set and ball screw 28 is asynchronized, such that rotation if the handwheel 12 in the illustrated clockwise direction causes rotation of the pulley set and ball screw 28 in the counterclockwise direction. Switching between a synchronized operation and an asynchronized operation accommodates different mechanical connection locations between the rack based electric power steering system 26 and the roadwheel 24, while turning the roadwheel 24, and therefore the vehicle, in the same resultant direction.

In addition to the mechanical design flexibility, the ability to switch polarities allows for switching of synchronization and asynchronization during forward and rearward vehicle driving modes. In a forward driving mode, the rotational directions of the steering input device and the roadwheel actuator are synchronized in FIG. 2 and asynchronized in FIG. 3, as explained in detail above. The forward driving mode may utilize either synchronization or asynchronization, depending upon the mechanical connection, as described above, to effect a vehicle turning direction in the same rotational direction as the steering input device. The remaining driving modes are described with reference to synchronized actuators in the forward driving mode (e.g., first driving mode) as an example, but it is to be appreciated that switching away from asynchronized actuators may be performed.

Figure 4:
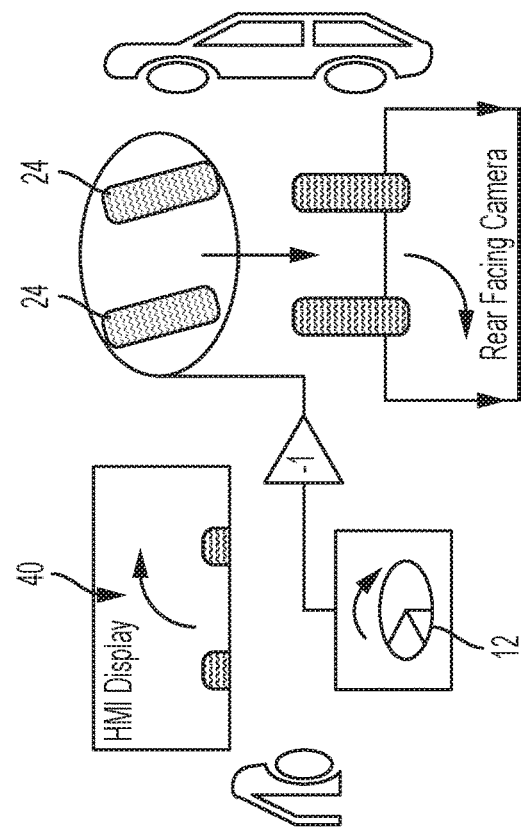
FIG. 4 is a schematic illustration of the steer by wire steering column system operating in the second polarity condition with optical components provided.

Referring now to FIG. 4, a rearward driving mode of the vehicle is illustrated. During rearward operation, steering logic is traditionally reverse of that of forward operation. In other words, an operator must turn the steering wheel in one direction (e.g., clockwise) to maneuver a backing vehicle in the opposite rotational direction (e.g., counterclockwise). The embodiments disclosed herein provide the ability to manipulate the polarity assignment between the handwheel actuator 14 and the roadwheel actuator 22. Specifically, the rearward driving mode switches the polarity to change from synchronized actuators 14, 22 to asynchronized actuators.

The system includes a rear view human machine interface (HMI) 40 that provides an image to an operator. The HMI 40 is a rear facing camera in some embodiments. When viewing the HMI 40, a driver is able to maneuver the backing vehicle as a rear end swing steering mechanism. In other words, the driver steers in a manner that he/she would normally employ for forward driving, with rotation of the handwheel actuator 14 in one direction (e.g., clockwise) resulting in rearward movement of the vehicle in the same rotational direction (e.g., clockwise). This is facilitated by the steering roadwheels 24 turning in a direction that is opposite of the direction they would normally turn in response to steering wheel rotation due to the polarity switch. A driver is above to simply view the HMI 40 and operate the steering wheel 12 in the same manner that would be performed during forward operation.

Figure 5:
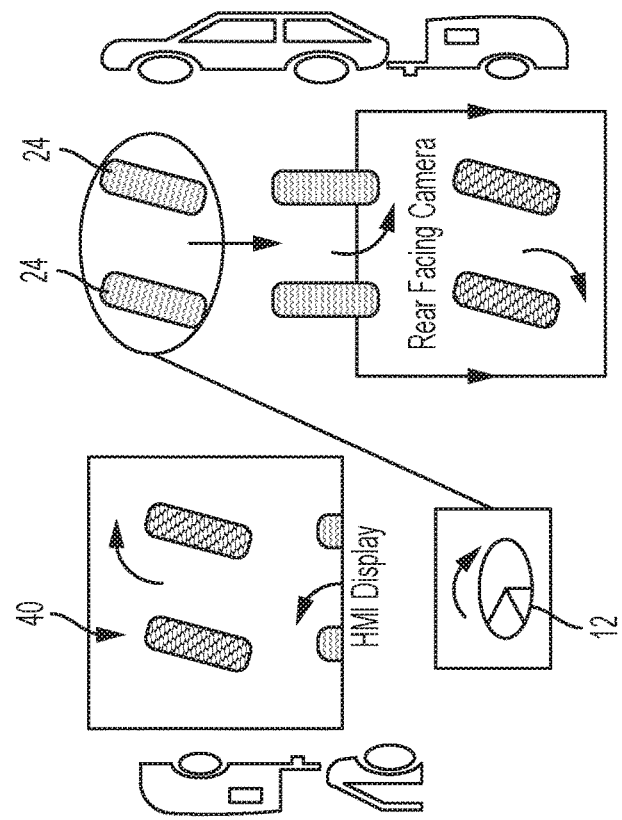
FIG. 5 a schematic illustration of the steer by wire steering column system operating in the first polarity condition with a trailer attached to the vehicle.

Referring now to FIG. 5, a third driving mode is illustrated. The third driving mode is a rearward driving mode, but with a trailer or other towed conveyance hitched to the vehicle. In this driving mode, the polarity is switched back to the first polarity that synchronizes the handwheel actuator 14 with the roadwheel actuator 22. In this driving mode, the synchronization between the handwheel actuator 14 and the vehicle's roadwheels 24 allows for direct control and placement of the trailer. Pairing this polarization adjustment with the rear view HMI 40, the vehicle is enabled with a trailer steering mode.

The embodiments disclosed herein allow polarization switching of one or more electrical components in a steer by wire steering system to desirably switch the direction of rotation of the roadwheels 24 in response to rotation of the steering wheel 12. Such a capability provides more intuitive steering by a driver during rearward driving modes of the vehicle.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments.

Having thus described the invention, it is claimed:

1. A steer by wire steering system for a vehicle comprising:
   at least one electrical communication component operatively connecting a handwheel actuator to a roadwheel actuator;
   the at least one electrical communication component switchable between a first polarity assignment and a second polarity assignment based on a detected driving condition of the vehicle, the first polarity assignment turning a roadwheel in a first direction in response to a first input rotational direction of the handwheel actuator, the second polarity assignment turning the roadwheel in a second direction in response to the first input rotational direction of the handwheel actuator.

2. The steer by wire steering system of claim 1, wherein the first polarity assignment results in synchronization between the first input rotational direction and a vehicle turning direction, the second polarity assignment resulting in asynchronization between the first input rotational direction and the vehicle turning direction.

3. The steer by wire steering system of claim 1, wherein the at least one electrical communication component is in the first polarity assignment when the vehicle is in a forward driving condition and in the second polarity assignment when the vehicle is in a rearward driving condition.

4. The steer by wire steering system of claim 3, further comprising a rear view human machine interface for guiding the steering during movement in the rearward driving condition.

5. The steer by wire steering system of claim 3, further comprising a rear view mirror for guiding the steering during movement in the rearward driving condition.

6. The steer by wire steering system of claim 1, wherein the roadwheel actuator comprises a rack based electric power steering assembly operatively coupled to the roadwheel, movement of the roadwheel actuator based on the polarity of the at least one electrical communication component.

7. The steer by wire steering system of claim 6, wherein the rack based electric power steering assembly is operatively coupled to the roadwheel with a linkage.

8. The steer by wire steering system of claim 1, wherein the first polarity assignment results in asynchronization between the first input rotational direction and the roadwheel actuator, the second polarity assignment resulting in synchronization between the first input rotational direction and the roadwheel actuator.

9. A steer by wire steering system for a vehicle comprising:
   at least one electrical communication component operatively connecting a handwheel actuator to a roadwheel actuator;
   the at least one electrical communication component switchable between a plurality of polarity assignments based on a detected driving condition of the vehicle, the plurality of polarity assignments comprising a first polarity assignment, a second polarity assignment and a third polarity assignment, the first polarity assignment turning a roadwheel in a first direction in response to a first input rotational direction of the handwheel actuator when the vehicle is in a forward driving mode, the second polarity assignment turning the roadwheel in a second direction in response to the first input rotational direction of the handwheel actuator when the vehicle is in a rearward driving mode without a trailer, the third polarity assignment turning the roadwheel in the first direction in response to the first input rotational direction of the handwheel actuator when the vehicle is in a rearward driving mode with a trailer.

10. The steer by wire steering system of claim 9, wherein the first polarity assignment results in synchronization between the first input rotational direction and a vehicle turning direction, the second polarity assignment resulting in asynchronization between the first input rotational direction and the vehicle turning direction, the third polarity assignment resulting in synchronization between the first input rotational direction and the vehicle turning direction.

11. The steer by wire steering system of claim 9, further comprising a rear view human machine interface for guiding the steering during movement in the rearward driving mode.

12. The steer by wire steering system of claim 9, further comprising a rear view mirror for guiding the steering during movement in the rearward driving mode.

13. The steer by wire steering system of claim 9, wherein the roadwheel actuator comprises a rack based electric power steering assembly operatively coupled to the roadwheel, movement of the roadwheel actuator based on the polarity of the at least one electrical communication component.

14. The steer by wire steering system of claim 13, wherein the rack based electric power steering assembly is operatively coupled to the roadwheel with a linkage.

15. The steer by wire steering system of claim 9, wherein the first polarity assignment results in asynchronization between the first input rotational direction and the roadwheel actuator, the second polarity assignment resulting in synchronization between the first input rotational direction and the roadwheel actuator.

* * * * *